US010215353B2

(12) United States Patent
Thompson et al.

(10) Patent No.: US 10,215,353 B2
(45) Date of Patent: Feb. 26, 2019

(54) ELECTRIC LIGHTING DEVICES USING AIR FLOW TO GENERATE A FLICKERING FLAME EFFECT

(71) Applicant: Luminara Worldwide, LLC, Eden Prairie, MN (US)

(72) Inventors: Jeffrey Thompson, Huntingdon Beach, CA (US); Douglas Patton, Irvine, CA (US)

(73) Assignee: Luminara Worldwide, LLC, Eden Prairie, MN (US)

(*) Notice: Subject to any disclaimer, the term of this patent is extended or adjusted under 35 U.S.C. 154(b) by 208 days.

(21) Appl. No.: 14/442,493

(22) PCT Filed: Oct. 16, 2013

(86) PCT No.: PCT/US2013/065284
§ 371 (c)(1),
(2) Date: May 13, 2015

(87) PCT Pub. No.: WO2014/062831
PCT Pub. Date: Apr. 24, 2014

(65) Prior Publication Data

US 2016/0109081 A1 Apr. 21, 2016

Related U.S. Application Data

(60) Provisional application No. 61/746,014, filed on Dec. 26, 2012, provisional application No. 61/714,687, filed on Oct. 16, 2012.

(51) Int. Cl.
*F21S 6/00* (2006.01)
*F21S 9/02* (2006.01)
(Continued)

(52) U.S. Cl.
CPC ............ *F21S 10/046* (2013.01); *F21S 6/001* (2013.01); *F21S 9/02* (2013.01); *F21V 33/0004* (2013.01); *F21W 2121/00* (2013.01)

(58) Field of Classification Search
CPC . F21S 10/046; F21S 6/001; F21S 9/02; F21V 33/0004; F21W 2121/00
See application file for complete search history.

(56) References Cited

U.S. PATENT DOCUMENTS 5,327,332 A 7/1994 Hafemeister
6,312,137 B1 11/2001 Hsieh
(Continued)

FOREIGN PATENT DOCUMENTS

CA 2779978 1/2012
CA 2886665 1/2012
(Continued)

OTHER PUBLICATIONS

Douglas Patton, Faux Flame, U.S. Appl. No. 61/293,516, 7 pages.

*Primary Examiner* — Mary Ellen Bowman
(74) *Attorney, Agent, or Firm* — Umberg Zipser LLP

(57) ABSTRACT

Lighting devices are described having a fan or other means to move air within the device to thereby cause movement of a flame element to simulate the movement of a real flame. In some embodiments, one or more scent cartridges can be disposed within the devices so that the air exiting the devices can be scented. Preferably, the devices include an air conduit to direct the air against the flame element and thereby increase the efficiency of the devices.

6 Claims, 8 Drawing Sheets

(51) Int. Cl.

| | |
|---|---|
| ***F21S 10/04*** | (2006.01) |
| ***F21V 33/00*** | (2006.01) |
| ***F21W 121/00*** | (2006.01) |

(56) References Cited

U.S. PATENT DOCUMENTS

| | | | | |
|---|---|---|---|---|
| 6,409,361 | B1 * | 6/2002 | Ikeda | F21V 19/0025 362/227 |
| 6,454,425 | B1 | 9/2002 | Lin | |
| 6,461,011 | B1 | 10/2002 | Harrison | |
| 6,955,440 | B2 | 10/2005 | Niskanen | |
| 6,966,665 | B2 | 11/2005 | Limburg et al. | |
| 7,093,949 | B2 | 8/2006 | Hart et al. | |
| 7,159,994 | B2 | 1/2007 | Schnuckle et al. | |
| 7,223,361 | B2 | 5/2007 | Kvietok et al. | |
| 7,261,455 | B2 | 8/2007 | Schnuckle et al. | |
| 7,350,720 | B2 | 4/2008 | Jaworksi et al. | |
| 7,481,571 | B2 | 1/2009 | Bistritzky et al. | |
| 7,503,668 | B2 | 3/2009 | Porchia et al. | |
| 7,686,471 | B2 | 3/2010 | Reichow | |
| 7,837,355 | B2 | 11/2010 | Schnuckle | |
| 8,070,319 | B2 | 12/2011 | Schnuckle et al. | |
| 8,132,936 | B2 | 3/2012 | Patton et al. | |
| 8,235,558 | B1 | 8/2012 | Lauer | |
| 8,371,740 | B2 | 2/2013 | Pestl et al. | |
| 8,412,029 | B2 | 4/2013 | Browder et al. | |
| 8,534,869 | B2 | 9/2013 | Patton et al. | |
| 8,628,223 | B2 | 1/2014 | Kwok et al. | |
| 8,783,888 | B2 | 7/2014 | McCavit et al. | |
| 8,789,986 | B2 | 7/2014 | Li | |
| 2003/0053305 | A1 | 3/2003 | Lin | |
| 2004/0165374 | A1 | 8/2004 | Robinson | |
| 2004/0257798 | A1 | 12/2004 | Hart et al. | |
| 2004/0264169 | A1 * | 12/2004 | Limburg | A61L 9/122 362/96 |
| 2005/0162850 | A1 * | 7/2005 | Luk | H05B 33/0857 362/227 |
| 2005/0169666 | A1 | 8/2005 | Porchia et al. | |
| 2005/0285538 | A1 | 12/2005 | Jaworski et al. | |
| 2006/0034100 | A1 * | 2/2006 | Schnuckle | B44C 5/06 362/161 |
| 2006/0125420 | A1 | 6/2006 | Boone et al. | |
| 2007/0127249 | A1 | 6/2007 | Medley et al. | |
| 2008/0031784 | A1 * | 2/2008 | Bistritzky | A01M 1/2033 422/124 |
| 2008/0112154 | A1 | 5/2008 | Reichow | |
| 2008/0130266 | A1 | 6/2008 | DeWitt et al. | |
| 2008/0150453 | A1 | 6/2008 | Medley et al. | |
| 2011/0027124 | A1 | 2/2011 | Albee et al. | |
| 2011/0110073 | A1 | 5/2011 | Schnuckle et al. | |
| 2011/0127914 | A1 | 6/2011 | Patton et al. | |
| 2011/0134628 | A1 | 6/2011 | Pesti et al. | |
| 2011/0204828 | A1 | 8/2011 | Moody et al. | |
| 2011/0255272 | A1 | 10/2011 | Privas | |
| 2012/0020052 | A1 | 1/2012 | McCavit et al. | |
| 2012/0134157 | A1 * | 5/2012 | Li | F21S 6/001 362/277 |
| 2013/0050985 | A1 | 2/2013 | Kwok et al. | |
| 2014/0177212 | A1 | 6/2014 | Li | |
| 2015/0109786 | A1 | 4/2015 | Li | |

FOREIGN PATENT DOCUMENTS

| | | | |
|---|---|---|---|
| CN | 2524064 | | 12/2002 |
| CN | 201344443 | | 11/2009 |
| CN | 102352966 | A | 2/2012 |
| CN | 202215951 | | 5/2012 |
| CN | 102563510 | A | 7/2012 |
| CN | 101918755 | B | 8/2012 |
| EP | 1878449 | | 1/2008 |
| EP | 2587127 | | 6/2011 |
| EP | 2565518 | | 3/2013 |
| GB | 2323159 | | 2/1997 |
| GB | 2379731 | | 3/2003 |
| JP | 6-52709 | | 2/1994 |
| JP | 2007527101 | | 9/2007 |
| JP | 4847347 | | 10/2011 |
| JP | 2012504310 | | 2/2012 |
| KR | 20020039952 | | 5/2002 |
| KR | 1020120098933 | | 9/2012 |
| WO | 2006020839 | | 2/2006 |
| WO | 2008016867 | | 2/2008 |
| WO | 2010039347 | | 4/2010 |
| WO | 2011112258 | | 9/2011 |
| WO | 2014/062831 | A2 | 4/2014 |

* cited by examiner

FIG. 4A
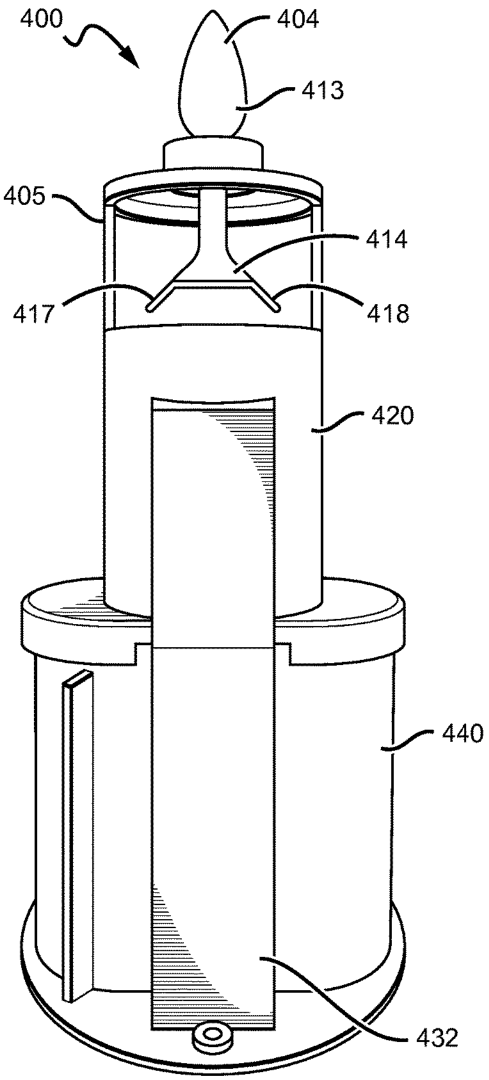
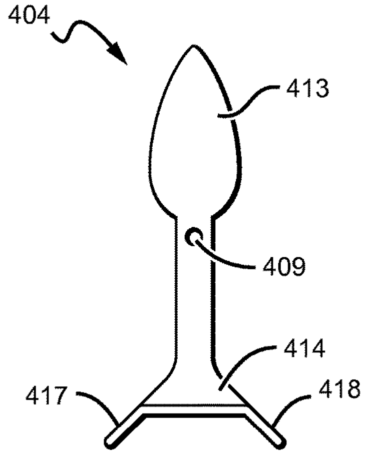
FIG. 4C
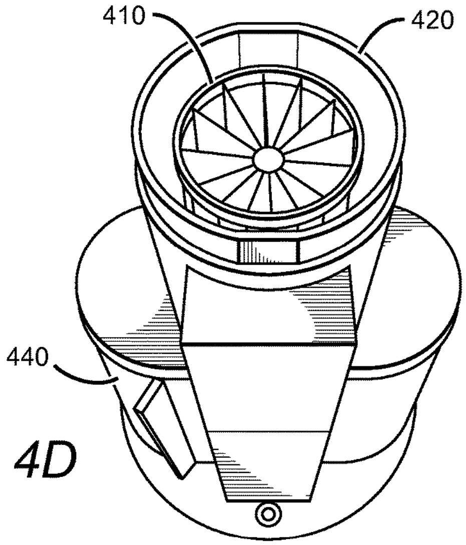
FIG. 4D

FIG. 5B
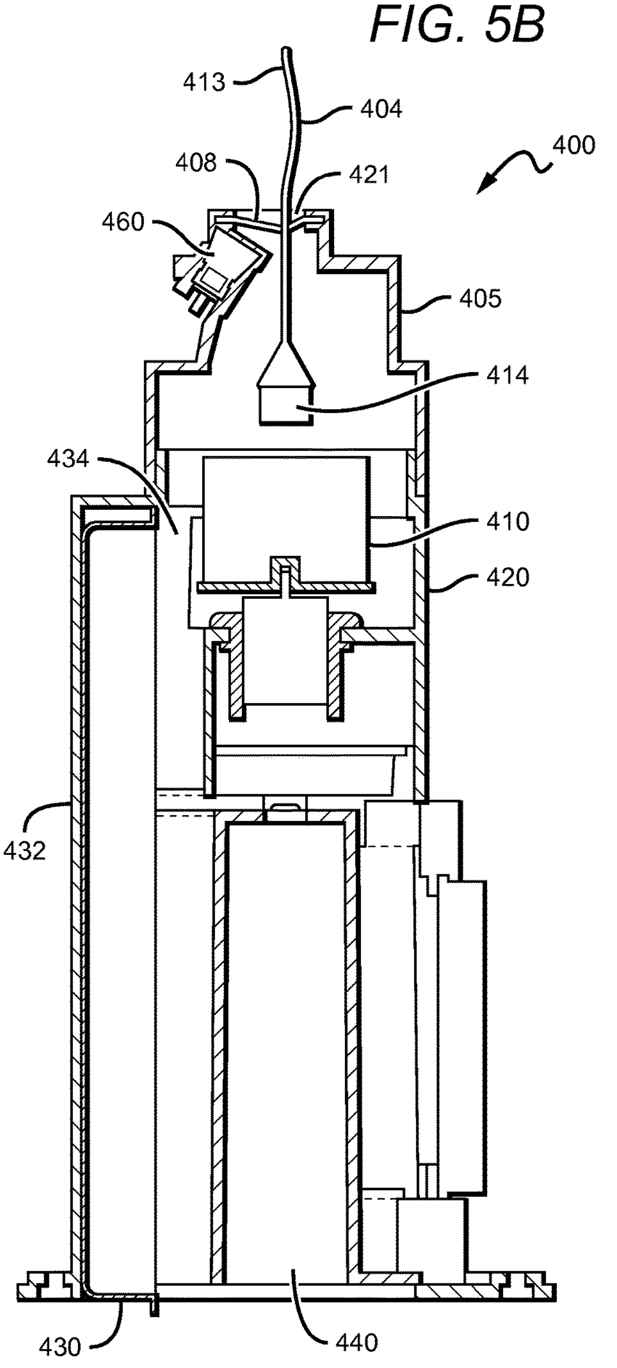
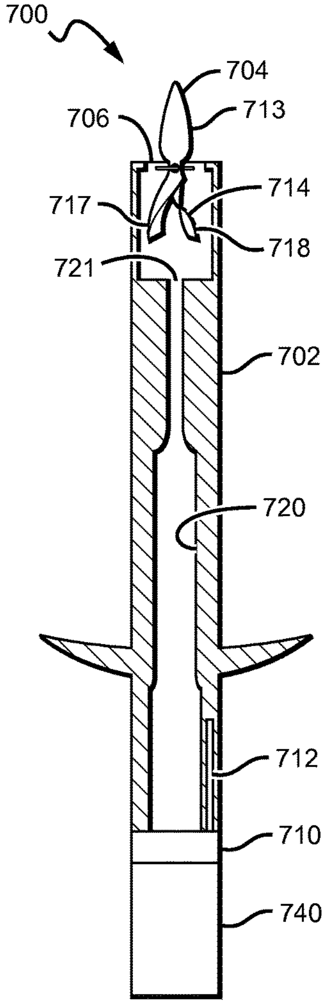
FIG. 7

FIG. 6
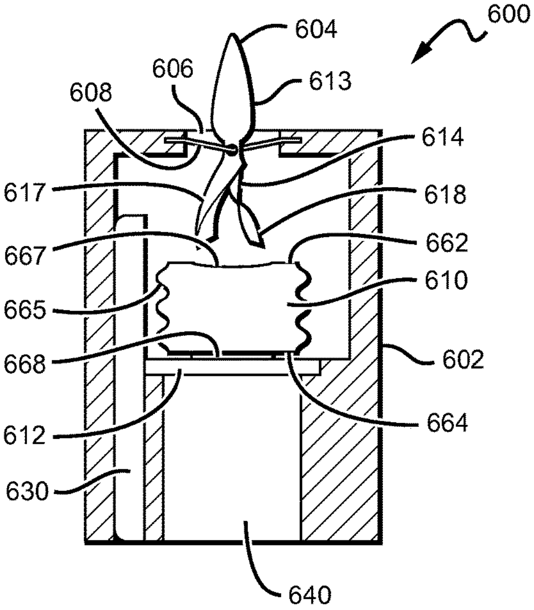
FIG. 8
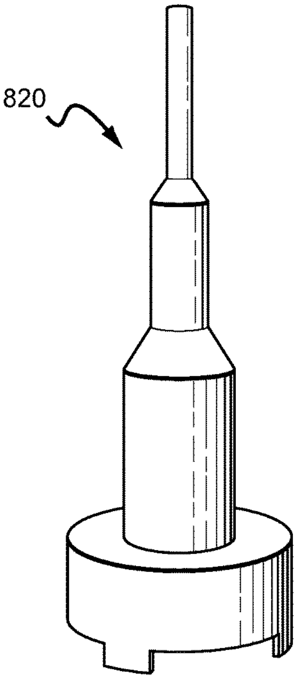
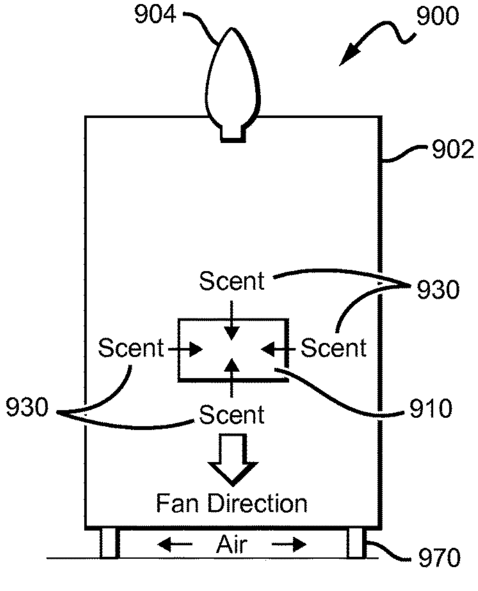
FIG. 9
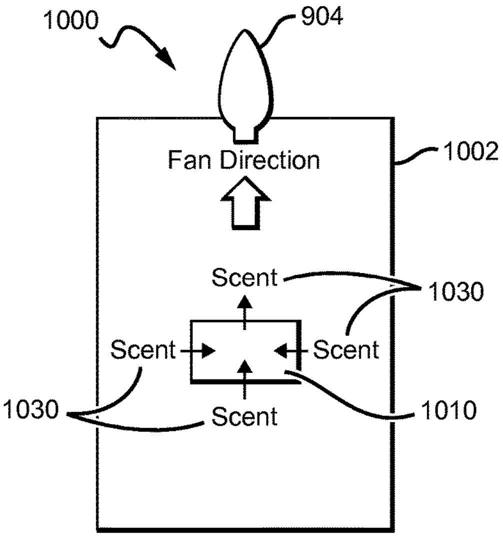
FIG. 10

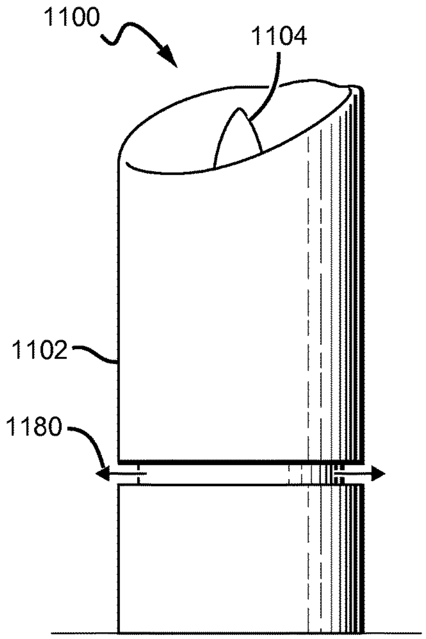
FIG. 11A
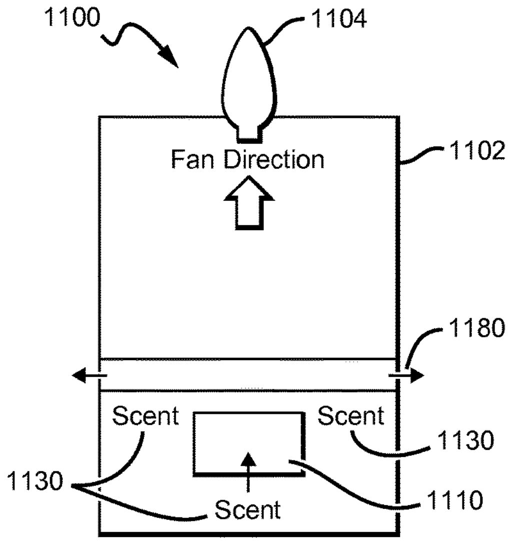
FIG. 11B
FIG. 12
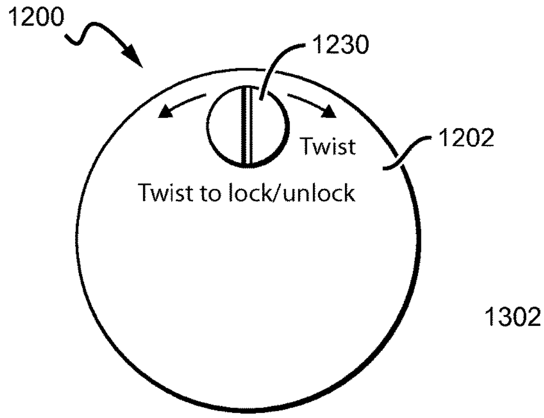
FIG. 13
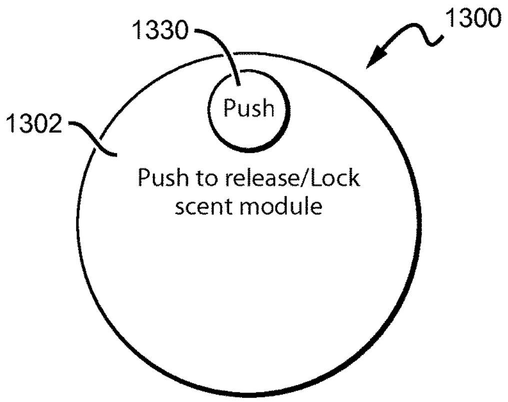

ELECTRIC LIGHTING DEVICES USING AIR FLOW TO GENERATE A FLICKERING FLAME EFFECT

This application is a U.S. National Stage of PCT/US13/65284, filed Oct. 16, 2013, which claims the benefit of priority to U.S. provisional application having Ser. No. 61/714,687 filed on Oct. 16, 2012, and U.S. provisional application having Ser. No. 61/746,014 filed on Dec. 26, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric lighting devices.

BACKGROUND

The following background discussion includes information that may be useful in understanding the present invention. It is not an admission that any of the information provided herein is prior art or relevant to the presently claimed invention, or that any publication specifically or implicitly referenced is prior art.

In the past, it was common to utilize a fan in conjunction with a cloth or other material to provide the appearance of a flame. See, e.g., UK pat. publ. no. 2379731 to Bridgman, UK pat. publ. no. 2323159 to Harrison, U.S. Pat. No. 6,454,425 to Lin, U.S. Pat. No. 6,312,137 to Hsieh, U.S. pat. publ. no. 2003/0053305 to Lin, U.S. pat. publ. no. 2004/0165374 to Robinson, and U.S. Pat. No. 7,686,471 to Reichow. However, such devices typically produced a unrealistic flame effect, especially when viewed from a close distance.

Various other electric lights are known in the art that emulate a flickering flame by varying a brightness of one or more light sources within the light. However, such light sources simulate the glow of a candle rather than simulate the appearance of a real flame.

In a marked improvement, it is known to utility an electromagnet to generate movement of a pendulum member and thereby simulate the flickering of a flame. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al. and U.S. pat publ. no. US 2011/0127914 to Patton et al. It is also known to utilize a fan to cause movement of a pendulum member. See, e.g., U.S. pat. publ. no. 2013/0050985 to Kwok et al. and U.S. pat. publ. no. 2012/0134157 to Li. However, such devices can be inefficient and can be improved through more efficient manners of simulating a flickering flame such as by using the inventive subject matter discussed herein.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved electric candles and other light sources that utilize air flow to produce a flickering flame effect.

SUMMARY OF THE INVENTION

The inventive subject matter provides apparatus, systems and methods in which one can generate a flickering flame effect in an electric candle or other light source using air flow such as that created by a fan or other device.

In one contemplated embodiment, an electric light has an outer housing with an aperture in an upper surface of the housing. A flame element can extend through the aperture, and is preferably mounted within the housing. A fan can be disposed within the outer housing such that rotation of the fan causes movement of air within the housing to thereby generate movement of the flame element. The housing can further include an air conduit disposed therein, which can be used to direct air against the flame element. In preferred embodiments, a first end of the flame element is disposed near an end of the air conduit, and preferably adjacent to the end of the conduit. This advantageously allows the flame element to take maximum advantages of the air flowing from or into the air conduit and can reduce the overall size of the fan required, the power necessary to operate the fan thereby increasing battery life, and the output of the fan.

In another contemplated embodiment, an electric light can include an outer housing having an aperture in an upper surface of the housing with a flame element that extends through the aperture. The light can include an expandable bellow configured to generate puffs of air as the bellows contract, which thereby cause movement of the flame element. In some contemplated embodiment, at least one of the surfaces of the bellows can comprise a ferrous material or magnet. The light can further include an electromagnet configured to cause the bellows to contract and thereby produce airflow within the housing.

In still another contemplated embodiment, an electric light can include an outer housing and a flame element that extends from the outer housing. A fan can be disposed within the outer housing to generate movement of air within the outer housing or an inner housing. A scent cartridge can be removably inserted into the housing, preferably via an aperture in the outer housing, such that a portion of the scent cartridge is disposed adjacent to the fan. Preferably, an exposed portion of the scent cartridge is disposed adjacent to the fan.

In another contemplated embodiment, an electric candle can include an outer housing having a first opening configured to receive a removable scent module. A flame element can extend from the outer housing. A fan can be disposed within the outer housing to generate movement of air within the outer housing or an inner housing. It is contemplated that the flame element can include a scent module on a lower portion of the flame element disposed within the housing. However, in an alternative embodiment, a scent cartridge can be inserted into the first opening such that at least a portion of the scent cartridge is disposed within the housing.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIGS. 4A-4B show a front view and an exploded view, respectively, of the internal components of another embodiment of an electric lighting device.

FIG. 4C shows a front view of the flame element of the device of FIG. 4A.

FIGS. 4D-4E show a top perspective view and a bottom perspective view, respectively, of assembled components of the electric lighting device of FIG. 4A.

FIGS. 5A-5B show a perspective view and a vertical cross-sectional view, respectively, of a schematic of the electric lighting device of FIG. 4A.

FIGS. 6-7 show vertical cross-sectional views of two additional embodiments of an electric lighting device.

FIG. 8 shows a front view of one embodiment of a Bernoulli tube for use in an electrical lighting device.

FIGS. 9-10 illustrates vertical cross-sectional views of two additional embodiments of an electric lighting device in which air flow moves upwardly and downwardly, respectively, within the devices.

FIGS. 11A-11B show a vertical cross-sectional view and a front view, respectively, of another embodiment of an electrical lighting device having a recess in a side wall of the housing.

FIGS. 12-13 show two different embodiments of a bottom of an electrical lighting device.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
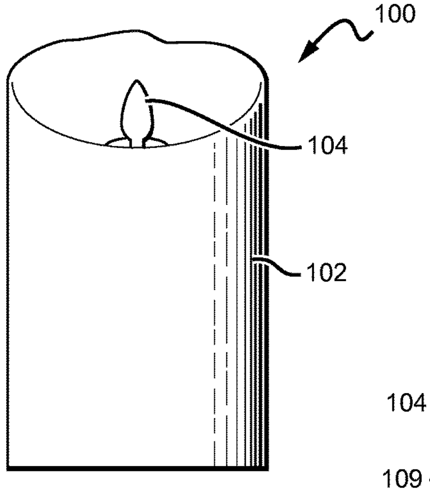
FIGS. 1A-1B show a front view and a vertical cross-sectional view, respectively, of one embodiment of an electric lighting device.
Figure 1B:
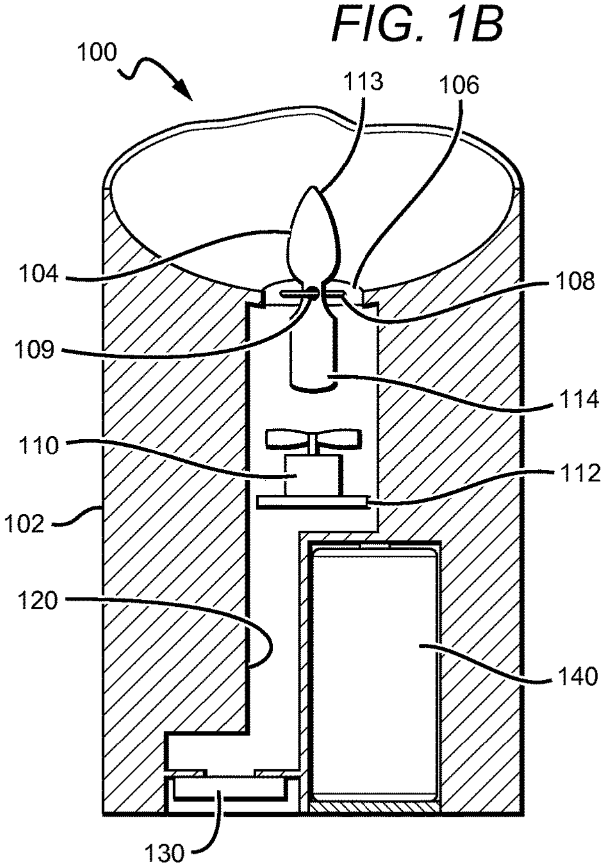

In FIGS. 1A-1B, one embodiment of an electric light 100 is shown that is configured to simulate a flickering flame of a lighted candle. Light 100 can include an outer housing 102, preferably constructed to resemble the outer body of a traditional wax candle. This may include wax drippings, a sculptured upper perimeter to resemble a partially melted candle. Of course, the outer housing 102 could be composed of any commercially suitable materials without departing from the scope of the invention.

The electric light 100 preferably includes a fan 110 or turbine disposed within the housing 102 sufficient to cause air flow within the light 100. As shown in FIG. 1B, fan 110 can be disposed in an air conduit 120, which helps direct air flow to impinge on a lower portion of a movable flame element 104. However, in alternative embodiments, it is contemplated that the fan 110 could be disposed outside of an air conduit, such as below or above the conduit, for example. Fan 110 is shown mounted above circuit board 112, although in other embodiments, fan could be disposed separately from the circuit board 112. Where fan is disposed below circuit board, it is contemplated that the board could include one or more air holes to allow air to flow through the board.

Flame element 104 preferably has an upper portion 113 and a lower portion 114, the upper portion extending through a hole 106 in the outer housing 102 and having a concave portion that simulates the shape of a flame. The flame element can be mounted within the housing 102 using a support wire 108 that extends through hole 109 in the flame element 104 to allow the flame element 104 to pivot about the wire 108. It is especially preferred that the hole 109 is larger than a diameter of the wire 108, such that the flame element 104 has two or more degrees of movement to enhance the flame effect.

In this manner, as the fan blades rotate, air is pulled through the conduit 120 toward the flame element 104, which causes movement of the flame element 104 with respect to the outer housing 102. As shown in FIG. 1B, a scent cartridge 130 can be inserted into a bottom portion of the housing 102, and is preferably disposed within the housing, such that as air is pulled into the light 100, the air passed by the scent cartridge 130 and the air exiting the light 100 through hole 106 or other outlet will be scented. However, other locations for the scent cartridge are also contemplated (e.g. above the fan, on a side wall, etc.). It is preferred that the scent cartridge 130 is removably insertable into the housing 102, such that the cartridge 130 can be replaced when desired. Thus, it is contemplated that different scents can be used over time as desired by a user.

One or more light sources can be disposed such that light can be emitted from the one or more light sources either directly or indirectly onto the flame element 104, such as through the use of a mirror, fiber optic cable, or other means.

Light 100 can further include a battery compartment 140 configured to receive one or more batteries. Alternatively or additionally, it is contemplated that the light 100 could include a photovoltaic cell to provide power to the light 100. It is further contemplated that the light 100 could include one or more rechargeable batteries and/or allow for power via a line voltage or a wireless charging station such as via induction or other commercially suitable means.

It is contemplated that the flame element could include one or more weights, either centered or off-centered, or be composed of one or more materials, which could cause different interactions of the flame element with the air flowing past the flame element.

In some contemplated embodiments, the light 100 can include a fan controller that operates the fan on a varying fan speed cycle to aid in generating a flickering flame effect with the flame element. Thus, rather than simply run the fan continuously for extended time periods, the fan can be instead run at varying speeds, varying durations, and/or turned on and off for set time periods to generate the flickering flame effect. These variations in operation of the fan may be repeating or non-repeating within a specified time period.

In an exemplary embodiment, it is contemplated that the fan could run for 500 ms to 2 seconds and then turn off for a period of between 500 ms to 3 seconds. Of course, the specific pattern and run durations and frequencies of the fan can vary depending on the size of the candle, the material of the flame element, and the desired effect.

In another contemplated embodiment, the fan could run at 20% of normal speed for three seconds, and then increase to normal speed for a set time period. Such pattern could alternate between reduced and normal speeds, and it is contemplated that the frequency of the reduced speed segments can be fixed or varied over time.

In still another embodiment, the fan could run at the following pattern: 100% power for 3 seconds and then off for 500 ms, followed by 100% power for 1 second and then off for 1 second, followed by 100% power for a period of between 500 ms-5 seconds and then off for 5 seconds. This pattern can then be repeated while the fan is on, or alternated with one or more alternate patterns of fan operation. Of course, the fan speed could also be varied within the pattern.

Figure 2:
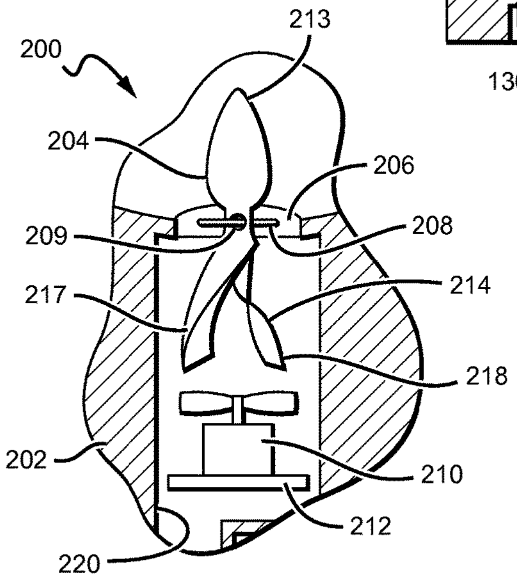
FIG. 2 illustrates an enlarged, vertical cross-sectional view of another embodiment of an electric lighting device.

FIG. 2 illustrates another embodiment of a light 200 having a fan 210 configured to cause movement of a flame element 204 as the fan 210 causes movement of air within light 200. Flame element 204 can include upper and lower (first and second) ends 213 and 214. The upper end 213 preferably extends upwardly from the housing 202 through hole 206. Lower end 214 preferably comprises a sail having first and second splines (blades) 217 and 218. Each of the splines 217-218 can have a curved portion, and it is especially preferred that the splines 217-218 are helical. The specific curvature of each of the splines 217-218 is set such that the splines 217-218 can maximize the force created when the air flow created by fan 210 impinges upon the splines 217-218 to thereby cause movement of the flame element 204.

In some contemplated embodiments, the flame element can comprise an injection molded plastic piece. However, it is also contemplated that the splines 217-218 could comprise a different material in addition to or as an alternative to plastic. For example, splines could comprise a fibrous material such as wood or paper or a ferrous material to allow the splines to interact with a magnetic field. In addition, splines could be molded, formed or stamped depending on their composition. With respect to the remaining numerals in FIG. 2, the same considerations for like components with like numerals of FIG. 1B apply.

Figure 3A:
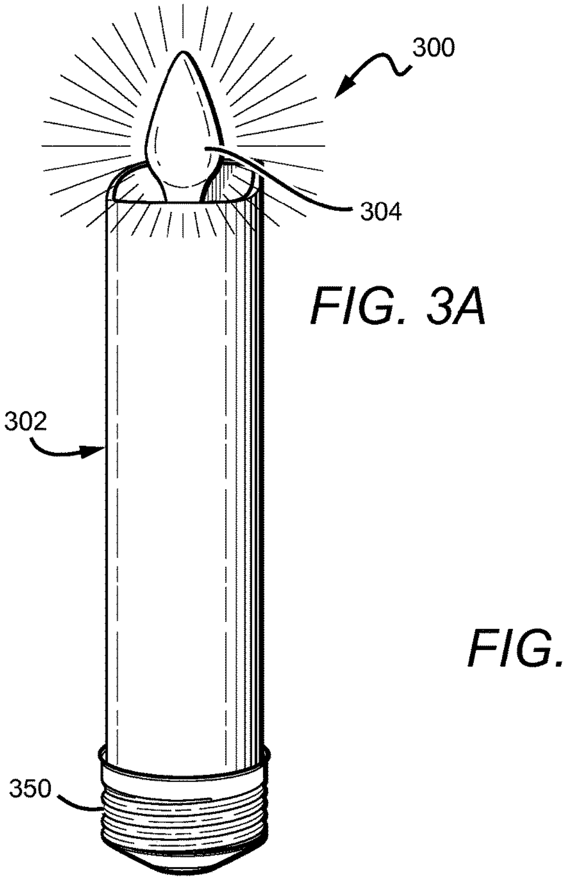
FIGS. 3A-3B show a front view and a vertical cross-sectional view, respectively, of another embodiment of an electric lighting device.
Figure 3B:
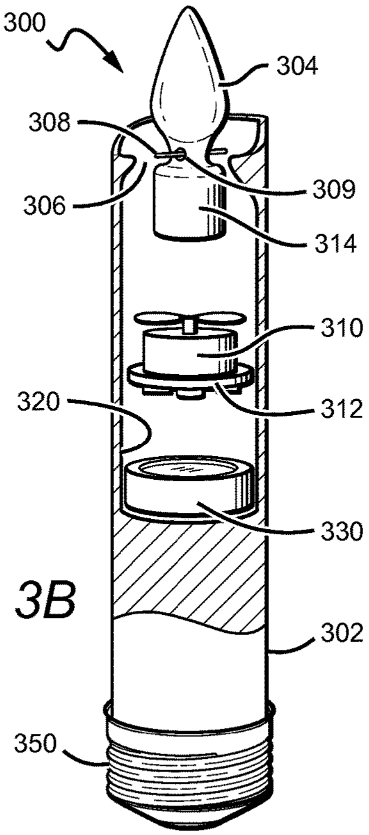

FIGS. 3A-3B illustrates another embodiment of a light 300 having a fan 310 configured to cause movement of a flame element 304. Light 300 advantageously can include a base portion 350 configured to allow insertion of the light 300 into a standard light socket and having an Edison screw fitting to couple the light 300 to the socket. In this manner, light 300 can be disposed in conventional lamps, candelabra, sconces, and other fixtures, which also act to provide power to the light 300. Rather than a standard light socket, it is contemplated that the base portion 350 could be configured to allow the light 300 to be inserted into other light sockets such as a bi-pin or bayonet mount. With respect to the remaining numerals in each of FIGS. 3A-3B, the same considerations for like components with like numerals of FIG. 1B apply.

Figure 4B:
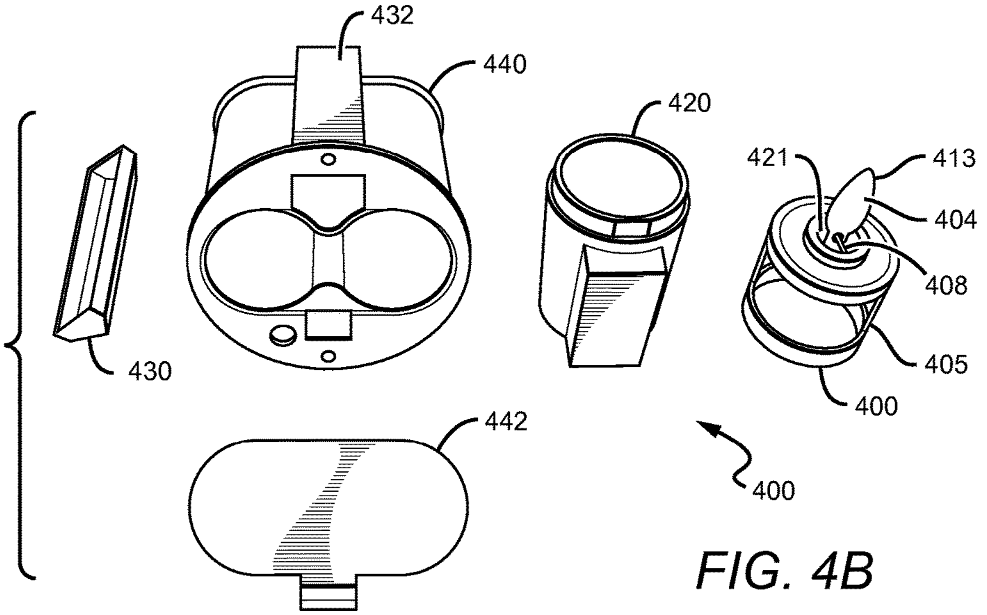

FIGS. 4A-4E illustrates an embodiment of a lighting device 400. FIG. 4A illustrates the internal configuration of the device 400, which could include an outer wax shell or other housing. Device 400 can include a flame element 404, a portion of which extends from an internal housing 405 through hole 421.

The flame element 404 preferably comprises upper and lower (first and second) ends 413 and 414 with the upper end 413 extending away from the internal housing 405 and the lower end 414 comprising a sail having first and second blades 417 and 418. As shown best in FIG. 4C, the first and second blades 417 and 418 preferably extend outwardly from a central portion of the flame element 404. Although shown as flat pieces, it is contemplated that either or both of the blades could have a curved portion. It is also contemplated that the sail could include three or more blades to facilitate movement of the flame element 404 due to air flow past the sail.

Figure 4E:
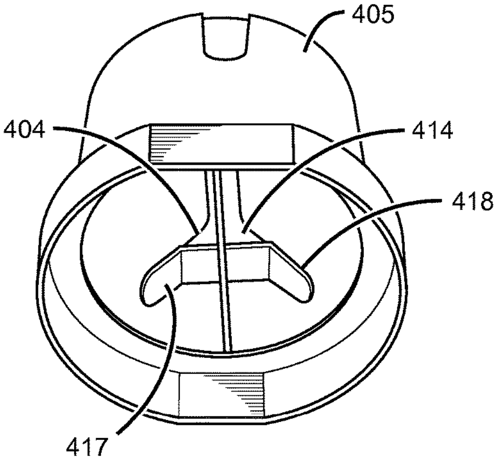

As shown in FIGS. 4D and 4E, it is preferred that the maximum span between the blades 417 and 418 equals or is within 10% of a diameter of the fan 410. This can help to increase efficiency of the device 400 by ensuring that a large percentage of the air flow generated by the fan 410 impinges on the blades 417-418 and the flame element 404.

It is preferred that the internal housing 405 has a diameter that is equal to a diameter of an air conduit, such that the majority, if not all, of the air flowing from the air conduit 420 will flow to internal housing 405 where the sail 414 of flame element 404 resides. In this manner, leakage of the air flow can be minimized to avoid the need for increased power or a larger fan to cause movement of the flame element 404. Likewise, where the fan 410 is configured to pull air away from the flame element 404, the air will preferably flow from the internal housing 405 to the air conduit 420.

Device 400 can include battery compartment 440 having cover 442. As shown in FIG. 4B, removing cover 442 reveals a slot into which a scent cartridge 430 can be inserted. A scent can then emanate from vent 432 as air moves within the device 400. Thus, the scent cartridge can be replaced easier when desired by simply removing cover 442 and sliding out cartridge 430.

With respect to the remaining numerals in each of FIGS. 4A-4E, the same considerations for like components with like numerals of FIG. 1B apply.

Figure 5A:
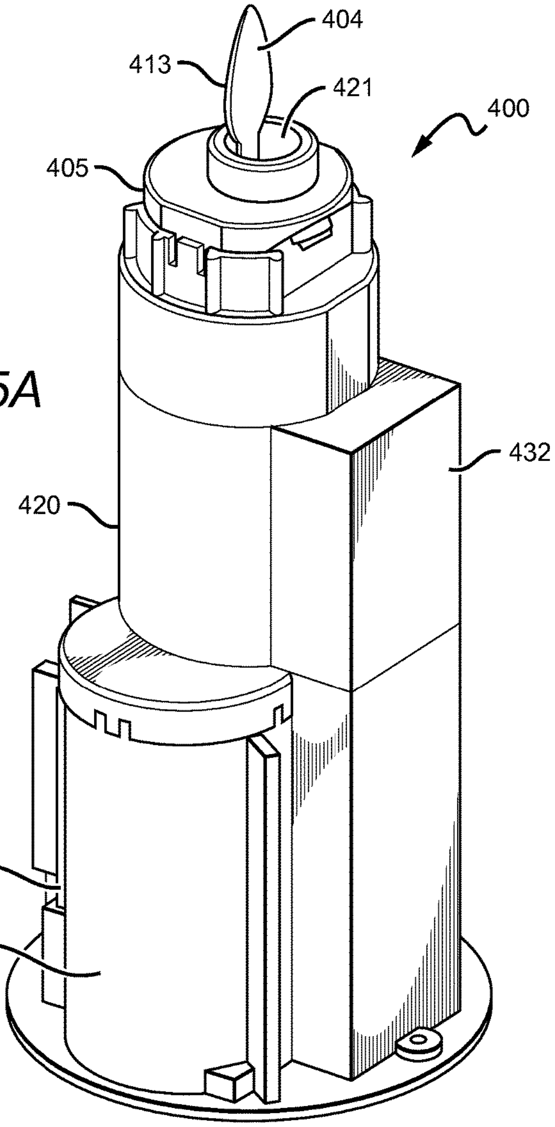

FIGS. 5A-5B are schematic views of the device 400 shown in FIGS. 4A-4E. As seen best in FIG. 5B, a scent cartridge 430 can be inserted through an opening in the bottom of the device 400. A top of the scent cartridge 430 can thereby positioned adjacent to the fan 410 such that air can flow past the scent cartridge 430 and exit through opening 421. Preferably wall 434 comprises a screen or other air conduit to allow scent to diffuse from the cartridge 430 to the air passing through air conduit 420.

Device 400 can further includes light source 460 disposed to emit light on to the flame element 404. Light source preferably comprises a LED, although any commercially suitable light source could be used.

Fan 410 is shown as having vertical fan blades, although horizontal blades or angled blades are also contemplated. With respect to the remaining numerals in each of FIGS. 5A-5B, the same considerations for like components with like numerals of FIG. 1B apply.

FIG. 6 illustrates another embodiment of a lighting device 600 having an expandable bellows 610 configured to cause air movement within the device 600. Device 600 comprises an outer housing 602 that has a hole 606 in an upper surface through which a flame element 604 can extend. Preferably, the flame element 604 is mounted within the housing 602 via support element 608 or other mechanism, such that the flame element 604 can pivot about the support element 608, and more preferably, move about at least two axes. Flame element 604 can include a sail 614 at a lower portion that has first and second splines 617-618, each of which preferably has a curved surface. Preferably, the sail 614 is disposed adjacent to an opening 667 in the first surface 662 of the bellows 610.

Bellows 610 is preferably disposed within the outer housing 602 and below the flame element 604, and configured to cause movement of air within the outer housing 602 to thereby cause movement of the flame element 604. Bellows preferably includes first and second surfaces 662 and 664, which can be coupled to one another via a collapsible wall 665. In this manner, as the surfaces 662 and 664 approach each other, or as one of the surfaces 662 or 664 approaches the other surface, the wall 665 can collapse. Preferably, wall 665 comprises a flexible material, such as plastic or rubber, for example.

Bellows 610 further includes an opening 667 through which air can enter and exit an interior cavity of the bellows 610. Preferably one of the surfaces 662 or 664 comprises a ferrous material or one or more magnets, and an electromagnet coil 668 is disposed near the other surface. In this manner, the coil 668 can cause the surface with the magnets or ferrous material to move toward the other surface through interaction of the surface with an electromagnetic field generated by the coil and thereby collapse the bellows 610 creating a puff of air from the interior cavity of the bellows 610, which can then cause the flame element 604 to move. IN a similar manner, the polarity of the electromagnetic field could be reversed to thereby cause the surface to move away from the other surface and thereby expand the bellows 610. Because of the manner in which the flame element 604 is mounted within the housing 602, it is contemplated that the bellows would only have to produce a small puff of air to effect movement of the flame element 604. Preferably, a maximum span between the splines 617-618 equals or is approximately equal to the diameter of hole 667.

Although shown with the coil 668 disposed beneath the bellows 610, it is also contemplated that the coil 668 could instead be disposed above the bellows 610 and closer to surface 662. In such embodiment, the coil 668 can cause the lower surface 664 to move upwardly toward the upper surface 662 and thereby collapse the bellows 610.

A scent cartridge 630 can be inserted through a bottom surface of the housing 602, and at least a portion of the scent cartridge 630 can be disposed adjacent to the bellows 610 such that at least a portion of the air exiting the bellows 610 can contact the scent cartridge 630.

FIG. 7 illustrates another embodiment of a lighting device 700 that includes a flame element 704 that at least partially extends through a hole 706 in an upper surface of the outer housing 702. Device 700 can further include an air conduit 720 disposed within the housing 702. Preferably, the air conduit comprises a Bernoulli tube, although other commercially suitable configurations are contemplated. The Bernoulli tube advantageously allows the duty of the fan 710 to be decreased, thus allowing for a lower fan speed and/or decreased fan size to effect movement of the flame element 704. The conduit can be formed of plastic, cardboard, or any other commercially suitable materials.

As shown in FIG. 7, the fan 710 can be disposed at a first end of the air conduit 720, although in alternative embodiments, it is contemplated that the fan could be disposed within conduit 720. Flame element 704, and in particular sail 714 of the flame element, can be disposed adjacent to a mouth 721 of the conduit 720, such that the air exiting the conduit 720 through the mouth 721 impinges on the sail 714.

Where housing 702 is elongated, it is contemplated that the circuit board 712 could be curved to fit within an interior of housing 702. Thus, for example, the circuit board 712 can be curved to parallel the perimeter of the housing 602. With respect to the remaining numerals in FIG. 7, the same considerations for like components with like numerals of FIGS. 1B and 2 apply.

FIG. 8 illustrates another embodiment of a Bernoulli tube 820, which can be utilized in place of an air conduit, as described above. The Bernoulli tube can include three separate sections, each of which has a decreasing diameter and is coupled to an adjacent section via a condensing section.

FIGS. 9 and 10 illustrate two additional embodiments of a lighting device 900 and 1000, respectively. In FIG. 9, the lighting device 900 has a fan 910 configured to cause air to move in an upwardly direction (e.g., toward flame element 904) with respect to the device 900. In contrast, in FIG. 10, the lighting device 1000 has a fan 1010 configured to cause air to move in a downwardly direction (e.g., away from flame element 1004) with respect to the device 1000. Of course, fan 910 or 1010 could be configured such that it can reverse the rotation of its blades so as to vary the direction of airflow from the fan. Devices 900 and 1000 can include one or more scent cartridges 930 and 1030, respectively, which are preferably disposed adjacent to fan 910 and 1010, respectively.

As shown in FIG. 9, device 900 can include legs 970 that raise a bottom surface of the housing 902 from a resting surface such that air can exit the housing 902. Alternatively, air could enter housing 902 through one or more vents in the bottom surface. With respect to the remaining numerals in each of FIGS. 9-10, the same considerations for like components with like numerals of FIG. 1B apply.

In FIGS. 11A-11B, another embodiment of a lighting device 1100 is shown having a recess 1180 in its outer housing 1102, which is configured to receive a scent cartridge. In such embodiments, it is contemplated that the scent cartridge could comprise two half rings, for example, each of which can be inserted into the recess 1180. This advantageously allows for multiple scents to be used at the same time. Alternatively, a scent cartridge 1130 can be inserted through the housing's bottom surface or elsewhere, allows the recess to act as a ventilation hole disposed between the fan 1110 and the flame element 1104. With respect to the remaining numerals in each of FIGS. 11A-11B, the same considerations for like components with like numerals of FIG. 1B apply.

FIGS. 12 and 13 illustrate bottom surfaces of two additional embodiments of a lighting device 1200 and 1300, respectively. In FIG. 12 the lighting device 1200 has a bottom surface 1202 through which a scent cartridge 1230 can be inserted. The scent cartridge 1230 preferably can be secured within the device 1200 by twisting the cartridge to lock or unlock. In FIG. 13, the lighting device 1300 also has a bottom surface 1302 through which a scent cartridge 1330 can be inserted. However, here, the scent cartridge 1330 can be secured within the device 1300 by pushing the scent cartridge 1330 until it clicks. To remove the cartridge 1330, a user can simply push the cartridge 1330 again, which will cause the cartridge 1330 to be partially expelled from the device 1300.

Figure 14:
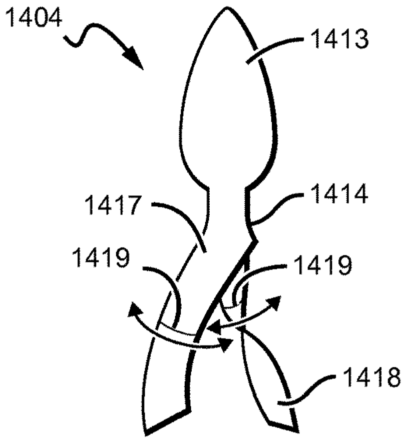
FIGS. 14-15 show front views of two different embodiments of a flame element for an electrical lighting device.
Figure 15:
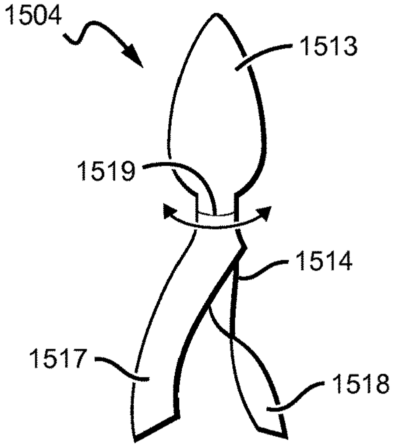

In FIG. 14, one embodiment of a flame element 1404 is shown having upper and lower portions 1413 and 1414. The lower portion 1414 preferably includes a sail having two or more splines 1417-1418 that are preferably curved. It is contemplated that each of the splines 1417-1418 could rotate about a pivot point 1419. FIG. 15 illustrates another embodiment of a flame element 1504 having upper and lower portions 1513 and 1514. The lower portion 1514 can also include a sail with two or more splines 1517-1518, each of which has a curved surface. The lower portion 1514 can be coupled to the upper portion 1513 via a pivot point 1519, which permits the lower portion 1514 and splines 1517-1518 to rotate with respect to the upper portion.

Figure 16:
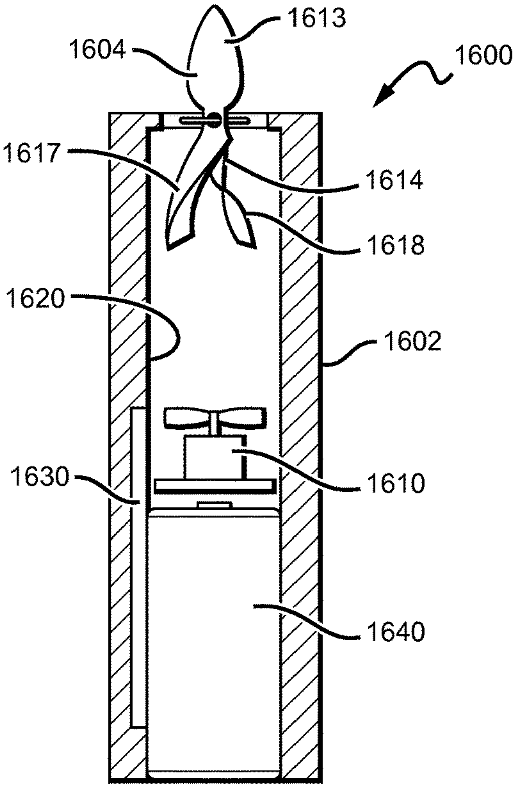
FIG. 16 shows a vertical cross-sectional view of another embodiment of an electrical lighting device.

FIG. 16 illustrates yet another embodiment of a lighting device 1600 that includes a housing 1602 in which a fan

1610 is disposed adjacent to an air conduit 1620. In other embodiments, it is contemplated that the fan 1610 could be disposed within the air conduit 1620. A scent cartridge 1630 is preferably inserted into the housing 1602 via a bottom surface such that an upper portion of the cartridge 1630 is disposed adjacent to the fan 1610. Of course, the cartridge 1630 could alternatively be inserted through a side or upper surface of housing 1602.

Device 1600 further includes a flame element mounted within the housing 1602 such that the flame element 1604 can move with respect to the housing. The flame element has a sail 1614 at a lower portion that includes first and second splines 1617-1618. It is especially preferred that a diameter of the sail (e.g., a maximum distance between an end of each spline) is equal to a diameter of the mouth of the air conduit 1620 nearest the sail 1614, and no greater than 10% difference of the diameter of the air conduit's mouth nearest the sail. This advantageously maximizes the amount of air impinging on the sail 1614 that would otherwise be wasted. This allows for a smaller fan to be used and/or a lower fan speed, which thereby decreases the amount of power required when the device is operating. Thus, contemplated devices can either run for a longer period of time when compared with similar devices without the air conduit as described, or run for the same period of time with lower battery power requirements. With respect to the remaining numerals in FIG. 16, the same considerations for like components with like numerals of FIG. 1B apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric light configured to generate a flickering flame effect, comprising:

a housing having an aperture in an upper surface of the housing;

a flame element that extends through the aperture, wherein the flame element has a first and second end, and is supported within the housing, such that the flame element moves with respect to the housing;

a fan disposed within the housing;

a reservoir configured to receive a scent cartridge;

an air conduit disposed within the housing with respect to the fan that directs air against the flame element, wherein the air conduit comprises a Bernoulli tube, wherein the air conduit comprises a first opening at which air can enter the air conduit and a second opening at which air can exit the air conduit, wherein the first opening of the air conduit is positioned near the scent cartridge, and wherein a lower surface of the housing comprises an opening sized and dimensioned such that the scent cartridge can be inserted into the reservoir; and a fan controller coupled to the fan and configured to operate the fan according to a stored pattern, wherein the fan is operated at full speed when initially powered on, and then operated at a reduced speed for a predefined time period;

wherein a first end of the flame element is disposed outside of the housing, and wherein the second end of the flame element comprises a sail; and wherein a diameter of the sail is equal to a diameter of the second opening of the air conduit nearest the sail.

2. The electric light of claim 1, wherein the fan is disposed within the air conduit.

3. The electric light of claim 1, wherein the sail is coupled to the second end of the flame element such that the sail can rotate with respect to the flame element.

4. The electric light of claim 1, wherein the sail is disposed adjacent to the second opening of the air conduit.

5. An electric light configured to generate a flickering flame effect, comprising:

a housing having an aperture in an upper surface of the housing;

a flame element that extends through the aperture, wherein the flame element has a first and second end, and is supported within the housing, such that the flame element moves with respect to the housing;

a fan disposed within the housing;

a reservoir configured to receive a scent cartridge, an air conduit disposed within the housing with respect to the fan that directs air against the flame element, wherein the air conduit comprises a Bernoulli tube, wherein the air conduit comprises a first opening at which air can enter the air conduit and a second opening at which air can exit the air conduit, wherein the first opening of the air conduit is positioned near the scent cartridge, and wherein a lower surface of the housing comprises an opening sized and dimensioned such that the scent cartridge can be inserted into the reservoir; and a fan controller coupled to the fan and configured to operate the fan according to a stored pattern, wherein the fan is operated at full speed when initially powered on, and then operated at a reduced speed for a predefined time period;

wherein a first end of the flame element is disposed outside of the housing, and wherein the second end of the flame element comprises a sail; and wherein the sail comprises first and second blades, and wherein a maximum span of the blades is equal to a diameter of the second opening of the air conduit.

6. The electric light of claim 1, wherein the fan is configured to direct an airflow away from the flame element.

* * * * *